United States Patent
Gribschaw et al.

[11] Patent Number: 6,072,545
[45] Date of Patent: Jun. 6, 2000

[54] VIDEO IMAGE ROTATING APPARATUS

[76] Inventors: Franklin C. Gribschaw; Paul W. Lang, both of 16631 Alliance Ave., #5, Tustin, Calif. 92780; Biljana Tadic-Galeb, 74 Maegan Place, #4, Thousand Oaks, Calif. 91360

[21] Appl. No.: 09/003,860

[22] Filed: Jan. 7, 1998

[51] Int. Cl.[7] .................................................. H04N 5/740
[52] U.S. Cl. .......................... 348/756; 348/789; 348/744; 348/739; 348/37; 359/446
[58] Field of Search ................................ 348/36, 37, 744, 348/750, 751, 752, 753, 754, 755, 756, 757, 759, 760, 761, 762, 763, 764, 766, 767, 776, 778, 779, 780, 789, 787, 739; 345/31; 353/74, 79; 359/446, 455–457, 460; H04N 5/740

[56] References Cited

U.S. PATENT DOCUMENTS

| | | |
|---|---|---|
| 3,976,837 | 8/1976 | Lang . |
| 4,760,443 | 7/1988 | Secka ...................................... 348/782 |
| 4,901,140 | 2/1990 | Lang et al. . |
| 4,943,851 | 7/1990 | Lang et al. . |
| 4,979,026 | 12/1990 | Lang et al. . |
| 5,061,049 | 10/1991 | Hornbeck . |
| 5,331,454 | 7/1994 | Hornbeck . |
| 5,450,094 | 9/1995 | Li et al. ...................................... 345/31 |
| 5,459,610 | 10/1995 | Bloom et al. . |
| 5,629,801 | 5/1997 | Staker et al. . |

FOREIGN PATENT DOCUMENTS

| | | |
|---|---|---|
| 1-189288 | 7/1989 | Japan .............................. H04N 5/740 |
| 6-273693 | 9/1994 | Japan .............................. H04N 5/740 |

OTHER PUBLICATIONS

"Digital Light Processing™ and MEMS: Reflecting the Digital Display Needs of the Networked Society," by Larry J. Hornbeck, dated Jun. 10–14, 1996, 13 pages.

"Challenges of a Digital Micromirror Device™: Modeling and Design," by R.L. Knipe, dated Jun. 10–14, 1996, 12 pages.

*Primary Examiner*—David E. Harvey
*Attorney, Agent, or Firm*—Kelly Bauersfeld Lowry & Kelley, LLP

[57] ABSTRACT

An image rotating apparatus presents a projected video image upon a rear projection screen that is rotated extremely rapidly about a vertical axis which exactly bisects the picture in the vertical plane. The rotational rate is such that an entire audience, regardless of their position about the apparatus, can view the projected video image simultaneously. The video image rotating apparatus utilizes light valve technology to create red, green and blue images from an analog composite video signal, and a Phillips prism that aligns the images produced by the light valves for projection through an optical system. The image produced by the light valves is rotated, either mechanically or electronically, in synchronization with rotation of the projection screen. The projection screen itself eliminates the need for a separate shutter by both expanding the projected image generally parallel to the screen's axis of rotation, and constricting the width of the projected image generally perpendicularly to the screen's axis of rotation.

42 Claims, 5 Drawing Sheets

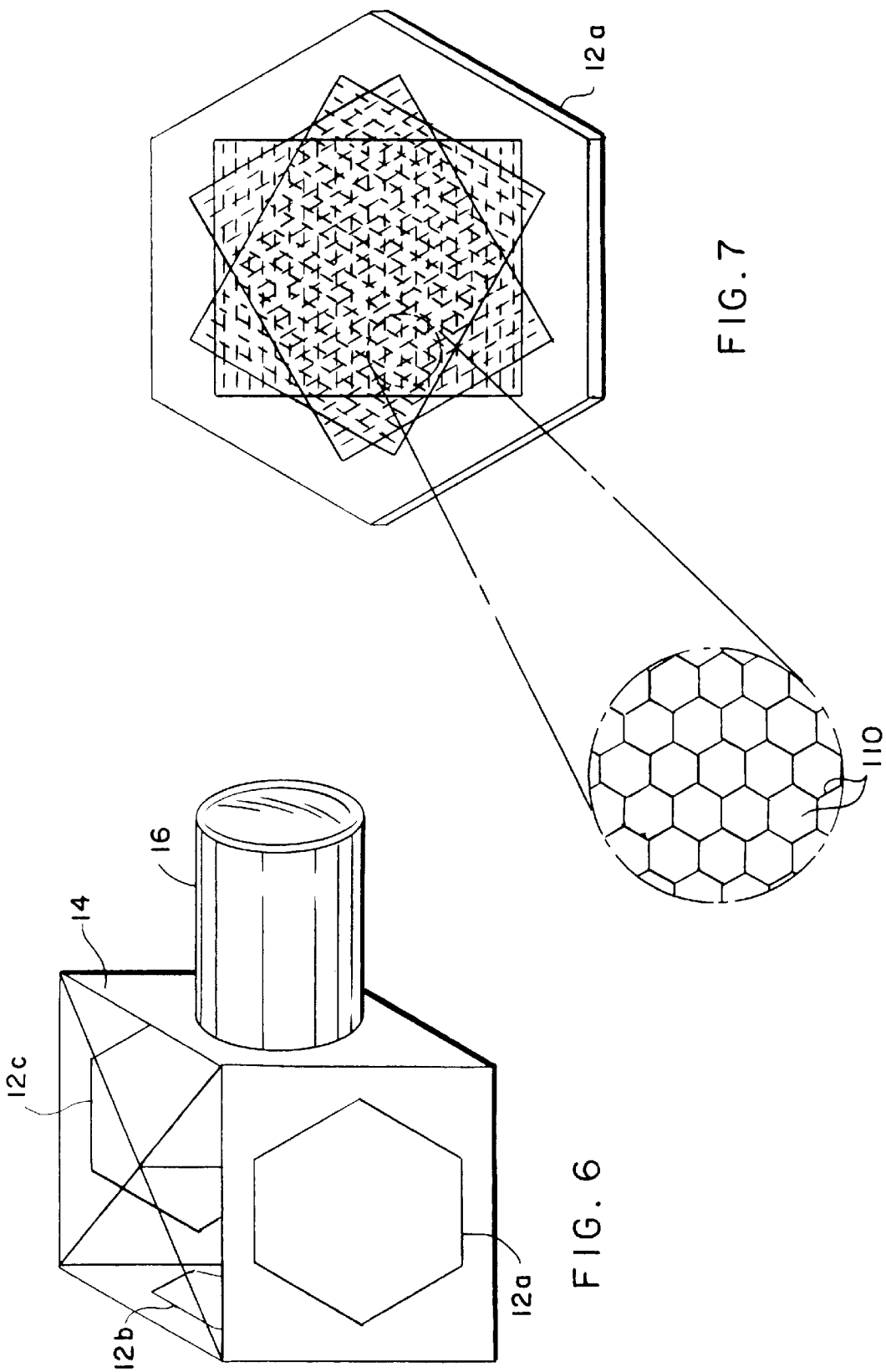

VIDEO IMAGE ROTATING APPARATUS

BACKGROUND OF THE INVENTION

This invention relates to image projection and television viewing systems. More particularly, this invention relates to a method and apparatus for enabling a centrally located video image to be viewed substantially simultaneously by an audience surrounding the image through a 360° span.

The general problem in the display of a picture print, a television image or a projection onto a screen is that the picture is best viewed when the viewer's line of sight is precisely normal to the plane of the picture. This ideal condition is difficult to realize when several people wish to view the picture simultaneously from varied locations.

One solution to this problem is to simply mount the picture on a rotating pedestal which will slowly rotate over 360°, permitting several people surrounding the pedestal to eventually view the picture in a line of sight normal to the plane of the picture. Such systems are often used in advertising displays within large areas such as railroad stations and the like. A problem with such an arrangement is that the rotation of the picture must be relatively slow in order to permit the various viewers to have an opportunity to study the picture. Such a slow rotation means that essentially only a few people at a time are viewing the picture while others out of the line of sight must wait until the picture comes into view.

There are many instances in which several people may wish to view a picture or displayed data simultaneously and continuously so that they can all carry on a meaningful discussion concerning the displayed information. For example, during business meetings a group of executives typically sit around a conference table, an arrangement which does not readily enable information presented on the table to be displayed to all in attendance. A great benefit would be realized if a means centrally located on the table were available which would permit everyone present to examine a picture or projected data substantially simultaneously. For example, the necessity of passing among the members of the group pictures to be successively viewed would be avoided. In addition, the ability to display data through a 360° range would prevent members from looking at a series of pictures out of order, a potential problem if duplicate sets of pictures were to be provided to each individual member.

Another drawback associated with conventional display systems is that special consideration must be given to the positioning of the display within its environment because, typically, conventional display systems, such as a television, cannot be viewed from the rear or extreme sides. Thus, the area within which a viewing audience can be accommodated is limited to locations with suitable sight lines. As a result, use of the space available around the display system is often limited by the presence of blind spots. Moreover, the positioning of furniture within a room can disadvantageously be dictated by a need to provide clear sight lines to a television or the like.

In an attempt to overcome the viewing limitations associated with conventional displays, 360° viewing systems have been developed, examples of which are shown in U.S. Pat. Nos. 3,976,837; 4,901,140; 4,943,851; and 4,979,026, the contents of which are incorporated herein by reference. More particularly, U.S. Pat. No. 4,943,851 disclosed a viewing system for presenting a projected image upon a rear projection screen that is rotated extremely rapidly about a vertical axis which exactly bisects the picture in the vertical plane. The rotational rate of the projection screen is such that an entire audience, regardless of their position about the viewing system, can view the projected image simultaneously. The viewing system features an optical system which rotates with respect to a cathode ray tube about the vertical axis in synchronization with the rotation of the projection screen. A liquid crystal display (LCD) screen is utilized to define a viewing window which is continuously redefined at sequential intervals to remain continually aligned with the projection screen. U.S. Pat. No. 4,901,140 discloses a viewing system that presents a real image in space that itself is rotated extremely rapidly so that an entire audience can view the same image substantially simultaneously and continuously. In this case, a black and white image projected from a cathode ray tube is projected through a parabolic mirror arrangement to provide the real image in space. An LCD screen is utilized to define a filtered viewing window which is continuously redefined at sequential intervals to remain continually aligned with the rotating real image in space. The LCD screen includes normally opaque red, green and blue filter panels which operate to give color to the real image in space. U.S. Pat. No. 4,979,026 discloses the use of a rotatable polarized screen and a separate, stationary polarized screen which cooperate to define a viewing window which remains continually aligned with the rotating real image in space.

Although such prior 360° viewing systems provided significant advancements over the prior art, additional features have been considered desirable in order to provide a more commercially acceptable product. For example, such prior systems have suffered from a visually perceptible blur at the edge of the projected image as it rotates past the viewer's line of sight. It has been found that such horizontal blurring of the image may be reduced by providing a slit in front of the projection screen, which rotates together with the screen. While horizontal image scanning may be accomplished watching the screen through the slit, however, most of the light from the rotating screen is lost on the inside wall of the rotating drum. Only a very small fraction of the projected image goes through the slit to reach the eye of the observer. The drawback of such an approach lies primarily in the reduction of the brightness of the projected image. In this regard, the apparent screen brightness is a function of the time integral of the stationary screen brightness and the visibility function, defined by the slit width. In other words, the apparent brightness of the rotational screen is 50 to 100 times less than the brightness of a stationary screen.

Accordingly, there exists a need for a visual display system that enables an entire audience to view a video image simultaneously regardless of an individual's location around the display system, and which can minimize, to the extent possible, visible blur at the edges of the projected video image. Additionally, an improved 360° viewing system is needed which utilizes a stationary projector and means for rotating the image produced by the projector in order to follow a rotating rear projection screen. The present invention fulfills these needs and provides other related advantages.

SUMMARY OF THE INVENTION

The present invention resides in a video image rotating apparatus or 360° viewing system which enables a video image to be viewed substantially simultaneously by an audience surrounding the picture through a 360° arc. The novel 360° viewing system utilizes a plurality of light valves for creating red, green and blue images, a Phillips prism that aligns the red, green and blue images to form a full color composite image, and an optical system that directs the composite image onto a rear projection screen. The rear projection screen is rotatable about an axis and includes means for expanding the projected image generally parallel to the screen's axis of rotation, and means for constricting the width of the projected image generally perpendicularly to the screen's axis of rotation. The particular screen utilized eliminates the need for a shutter and significantly reduces blurring of the projected image which has been characteristic of prior art systems. The video image produced by the light valves may be either mechanically rotated or, more preferably, an electronic image rotation system may be utilized for electronically rotating the images produced by the light valves in synchronization with rotation of the rear projection screen.

The video image rotating apparatus has a broad range of applications, including advertising marques, television sets and display screens for presenting travel information at airports, train stations and bus depots. The present invention advantageously enables information to be communicated simultaneously to a large audience because a 360° display is presented which maximizes sight lines to the viewing system and eliminates blind spots. This feature beneficially allows great flexibility in the positioning of furniture and the viewing system within a viewing area, thereby providing greater freedom of choice in the utilization of the space within the viewing area.

In a preferred form of the invention, the video image rotating apparatus comprises a projection screen, means for rotating the projection screen about an axis, and an optical system for continuously projecting an image onto the projection screen. The optical system comprises light valve means for creating the image, light guiding means, and optical means, wherein the optical means projects the image from the light valve means to the light guiding means which, in turn, directs the image to the projection screen. The means for rotating the projection screen includes means for synchronously rotating the projection screen and the light guiding means at a predetermined rate of rotation. The optical means further includes a Pechan prism and a projection lens assembly that is associated with the Pechan prism.

The light valve means comprises a plurality of high definition light valves and a Phillips prism that aligns the images produced by the light valves for projection through the optical means. The light guiding means includes first, second, third and fourth mirrors. The first mirror is positioned to intercept the projected image from the optical means and reflect the image to the second mirror. The second mirror is positioned to intercept the reflected image from the first mirror and reflect the image onto the third mirror. The third mirror is positioned to intercept the reflected image from the second mirror and reflect the image onto the fourth mirror. Finally, the fourth mirror is positioned to intercept the reflected image from the third mirror and reflect the image onto the projection screen. Notably, the first mirror and the projection screen are located on the axis of rotation.

With reference to the projection screen itself, the means for expanding the projected image generally parallel to the screen's axis of rotation comprises a first surface of the projection screen that includes a micro cylindrical structure on top of a positive macro cylindrical structure. The macro and micro cylindrical structures are parallel to the width of the projection screen. In the illustrated embodiment, the micro cylindrical structure comprises radial surfaces having a radius of approximately 213 microns at a pitch of approximately 250 microns. The macro cylindrical structure comprises a radial surface having a radius of approximately 340 mm.

The means for constricting the width of the projected image generally perpendicularly to the screen's axis of rotation comprises a second surface of the projection screen that forms a fresnel positive cylindrical lens that is parallel to the height of the projection screen. In the illustrated embodiment, the fresnel lens has a pitch of approximately 0.33 mm and a focal length of approximately f1=730 mm on a radius of a cylinder equal to 360 mm.

In order that the same video image be viewed throughout the entire 360° arc during operation of the image rotating apparatus, it is necessary that the video image be rotated through the optical means in sync with rotation of the projection screen. This enables any viewer in the audience to periodically have a line of sight in alignment with a proper viewing angle for the projected image. When the rotational rate in revolutions per minute is sufficiently great (preferably about 1140 rpm), all viewers surrounding the video image rotating apparatus will see the same picture substantially simultaneously and continuously.

One method of rotating the video image through the optical means is to simply turn the Pechan prism in sync with rotation of the projection screen. A more preferred method, however, involves electronic image rotation through the light valves. In an electronic image rotation system, a color processor circuit is utilized to separate red, green and blue (RGB) signals contained in a composite video input signal. These RGB signals are converted from an analog to a digital format and stored within a random access memory (RAM). An input address generation circuit provides the RAM with input from means for separating the composite video input signal into horizontal and vertical synchronization pulses. An output generation circuit selects data stored in the RAM according to an algorithm that creates a video output signal from the stored data. An image recreated from the video output signal will appear to rotate on the light valves. To facilitate creation of the video output signal, first and second buffers are interchangeably used within the RAM such that one buffer is used to store the RGB signals while the other buffer is used in creating the video output signal.

A stationary transparent encasement surrounds the rotatable projection screen. The encasement may be adapted to reduce glare by utilizing tinted plexiglass or the like, and may, if desired, further utilize a concave exterior encasement surface. A vacuum is drawn within the encasement to minimize friction and noise as the projection screen is rotated rapidly during operation of the video image rotating apparatus.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 6 is a perspective schematic view of three light valves surrounding a Phillips prism which aligns the images produced by the light valves for projection through the lens assembly of FIG. 4;

FIG. 7 is a schematic representation of a face of one of the light valves shown in FIG. 6, illustrating the step-wise rotation of a video image produced thereon and the inclusion of hexagonal pixels on the face of the light valve to facilitate such step-wise rotation.

DETAILED DESCRIPTION OF THE PREFERRED EMBODIMENT

Figure 1:
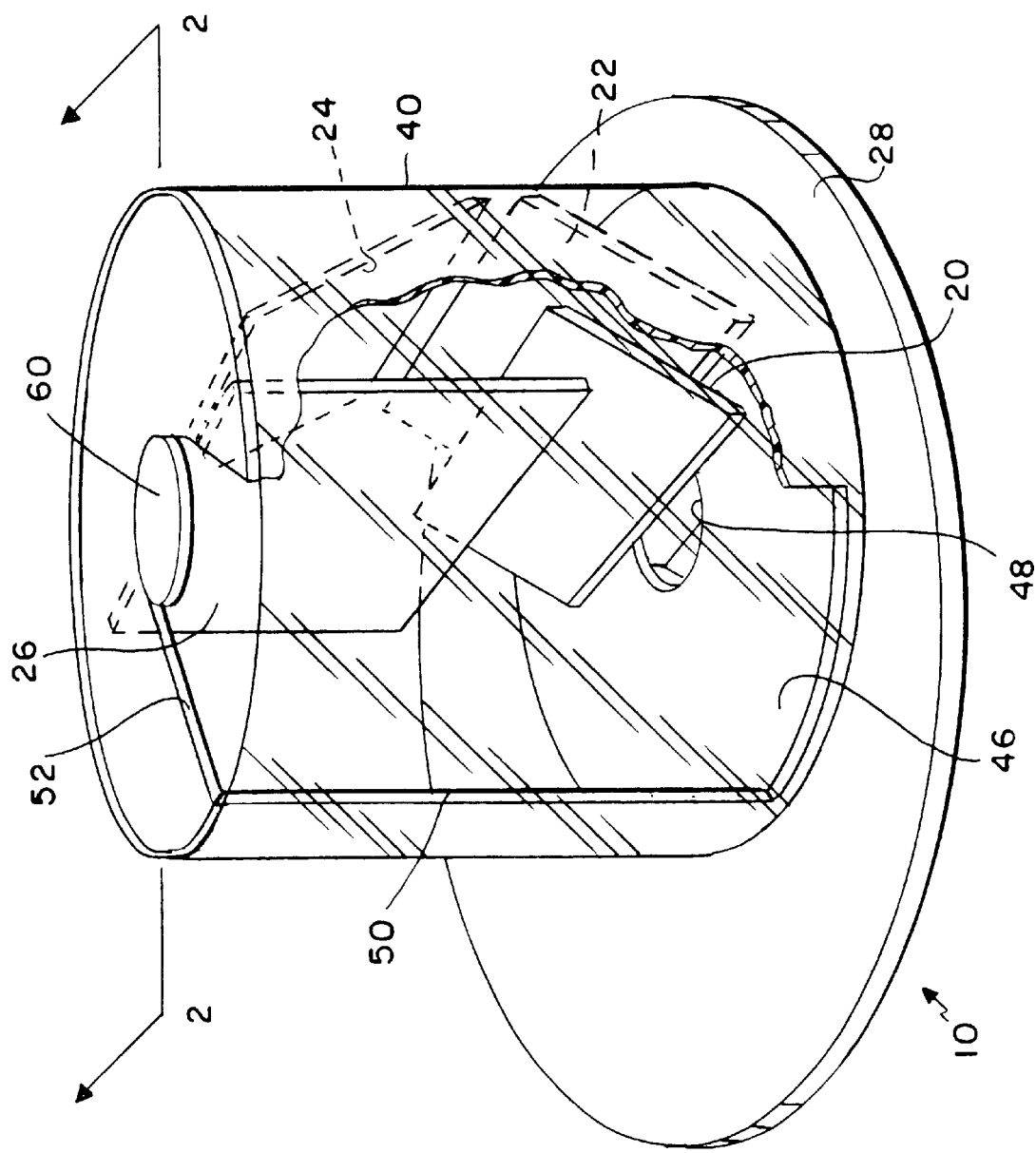
FIG. 1 is a top and side perspective view, partly in phantom, of a video image rotating apparatus embodying the invention.
Figure 2:
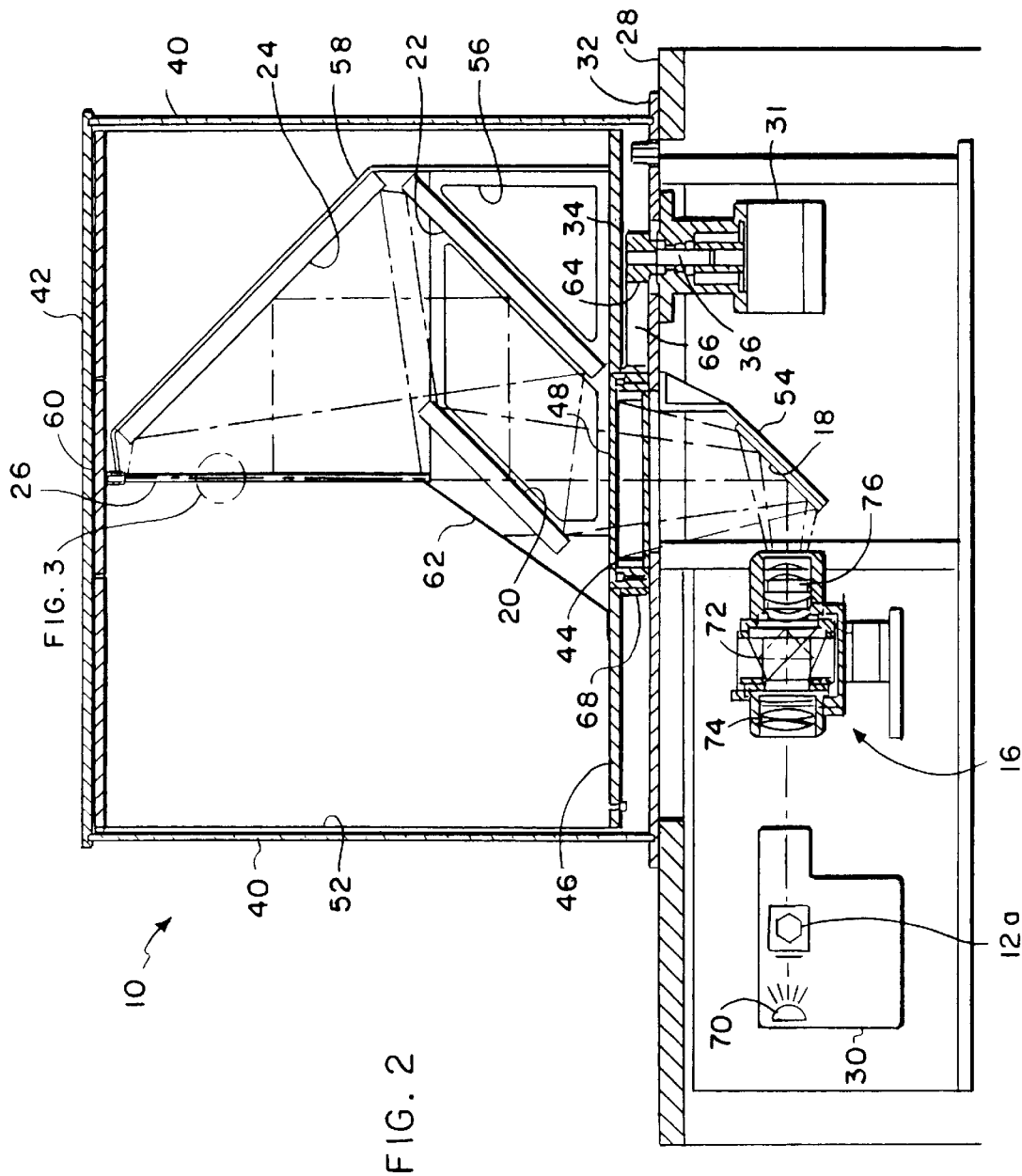
FIG. 2 is a cross-sectional view of the video image rotating apparatus taken generally along the line 2—2 of FIG. 1, illustrating the various internal components within an upper section that houses a rotatable screen and associated mirrors, and a lower section that houses a drive motor, lens assembly and a projection unit.
Figure 5:
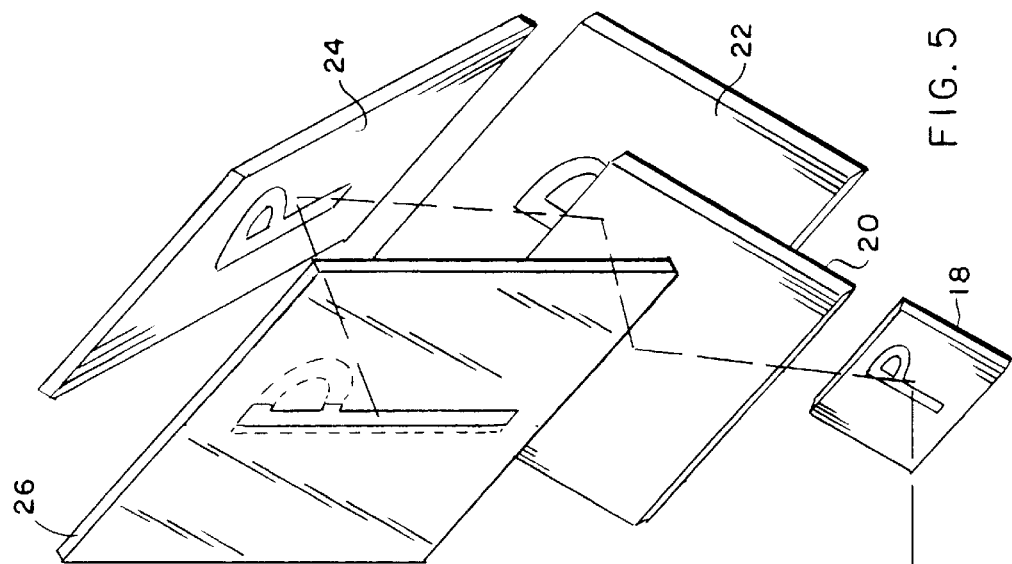
FIG. 5 is a perspective schematic view of the optical path from the projection lens assembly to the rear projection screen.

As shown in the drawings for purposes of illustration, the present invention resides in a video image rotating apparatus 10 which enables a video image to be viewed substantially simultaneously by an audience surrounding the apparatus through a 360° arc. The apparatus 10 utilizes a plurality of light valves 12a–c to produce the video image adjacent to a Phillips prism 14, which aligns the video images for projection through a lens assembly 16. Four mirrors 18, 20, 22 and 24 direct the projected image from the lens assembly 16 onto a rear projection screen 26. The rear projection screen 26 has a unique construction that focuses the light passing therethrough which, eliminates the need for a shutter. Moreover, the screen 26 expands the projected image in a direction parallel with the axis of rotation.

The video image rotating apparatus 10 has a broad range of applications, including advertising marques, television sets and display screens for presenting travel information at airports, train stations and bus depots. The present invention advantageously enables information to be communicated simultaneously to a large audience because a 360° display is presented which maximizes sight lines to the viewing system and minimizes blind spots. This feature beneficially allows great flexibility in the positioning of furniture and of the viewing system within a viewing area, thereby providing greater freedom of choice in the utilization of space within the viewing area. Moreover, the video image rotating apparatus 10 of the present invention specifically overcomes drawbacks noted in connection with similar prior systems. In particular, blurring of the video image has been reduced or eliminated to the extent possible. Moreover, the present invention advantageously utilizes light valve technology that permits a sharp image to be produced and projected through the optical system of the apparatus. The combination of light valve technology and the novel projection screen results in an image that may be thirty times brighter than the source image would be on a normal screen.

In accordance with the present invention, and with reference to FIGS. 1–7, the apparatus 10 includes a housing 28 in which is situated a projector 30, the lens assembly 16, the first mirror 18 and an electric motor 31 which drives an assembly rotatable with the rear projection screen 26. A base plate 32 is mounted to an upper surface of the housing 28, and includes a first aperture 34 through which a shaft 36 for the motor 31 extends, and a second aperture 38 that is aligned with an axis of rotation for the rear projection screen 26. A clear acrylic cylinder 40 extends upwardly from the base plate 32, and a top plate 42 overlies the cylinder 40 to enclose an air-tight chamber in which the rear projection screen 26 and the other associated rotatable components move.

Surrounding the second aperture 38 is a bearing 44 which rotatably supports a drum base 46 relative to the base plate 32. The drum base 46 also includes an aperture 48 in alignment with the second aperture 38 through the base plate 32 and the axis of rotation of the projection screen 26. A opaque light shield 50 extends upwardly from the drum base 46 generally coextensively with the cylinder 40 with the exception of a window 52 aligned with the center of the front surface of the rear projection screen 26.

A first mirror bracket 54 extends downwardly from an inner surface of the housing 28 to support the first mirror 18 in alignment with both the lens assembly 16 and the second aperture 38 through the base plate 32. A second mirror bracket 56 supports both the second and third mirrors 20 and 22 as shown. Finally, a third mirror bracket 58 extends upwardly from the drum base 46 to an upper screen support 60 to position the fourth mirror 24. The mirrors 18–24 provide means for guiding the image projected through the lens assembly 16 to the rear surface of the rear projection screen 26. In particular, the first mirror 18 is positioned to intercept the projected image from the lens assembly 16 and reflect the image to the second mirror 20. The second mirror 20 is positioned to intercept the reflected image from the first mirror 18 and reflect the image onto the third mirror 22. The third mirror 22 is positioned to intercept the reflected image from the second mirror 20 and reflect the image onto the fourth mirror 24. The fourth mirror is then positioned to intercept the reflected image from the third mirror 22 and reflect the image onto the projection screen 26. All but the first mirror 18 will rotate with the drum base 46 and rear projection screen 26 during operation of the video image rotating apparatus 10. The first mirror 18 is stationary. In order to make the rotating portions of the apparatus 10 as light as possible, the second, third and fourth mirrors 20–24 may be constructed of highly reflective Mylar film stretched over a Styrofoam frame.

The rear projection screen 26 is generally rectangular and supported at its upper end by the upper screen support 60 and at its lower end by a lower screen support base 62. A drive pulley 64 is mounted on the end of the motor shaft 36 (between the base plate 32 and the drum disk 46), and a belt 66 extends from the drive pulley 64 to a driven pulley 68 mounted exteriorly of the bearing 44 to turn the drum base 46. The illustrated assembly is designed to rotate the drum base 46, and therefore also the rear projection screen 26 and the second through fourth mirrors 20–24, at a high rate of speed, preferably approximately 1440 RPM. The light shield 50, which forms the wall of the drum, is opaque except for the window 52 which is aligned with the front surface of the rear projection screen 26. Since the light shield 50 rotates with the drum base 46, the window remains aligned with the front surface of the rear projection screen 26. The window spans a 55° arc relative to the circumference of the cylinder 40. Since the outer stationary cylinder 40 is transparent, observers surrounding the video image rotating apparatus 10 are able to view a portion of the rear projection screen 26 through the window 52 as it rotates into the viewer's line of sight. Preferably, when the rear projection screen 26 is being rotated a vacuum is drawn inside of the cylinder 40 to reduce air flow and drag on the inner rotating drum and also to reduce noise.

The projector 30 includes a high intensity light source 70 such as a metal halide lamp, three light valves 12a–12c and a Phillips prism 14. The light valve 12 presently preferred is the Proxima 9200 3-chip, polysilicone liquid crystal display (LCD) light valve manufactured by Sanyo. Such a light valve has a resolution of 1024×768. Other light valves, however, may be advantageously utilized in connection with the present invention, such as the Texas Instrument digital light processor (DLP), with three micro-mirror devices (DMD). The term light valve as utilized in connection with this invention includes LCD valves, grating light valves (GLV), digital micro-mirror devices (DMD) or other reflective or transmissive devices capable of producing an image from digital input.

The three light valves 12a–12c are arranged around the Phillips prism 14, which acts to optically overlap the images created by the light valves. The standard form of light valves consists of a row and column layout of the individual pixel elements. For most applications, this application is quite adequate. However, as illustrated in FIG. 7, a hexagonal mosaic for the pixels 110 is preferred. As illustrated in FIG. 7, when an image of, for example, high definition drawings, is formed on a light valve made up of hexagonal pixels 110, the pattern of the pixels will be identical for at least six different orientations. That is to say that when an image is rotated on the light valve, it will have exactly the same appearance in six positions.

The use of light valves 12a–12c is advantageous for the video image rotating apparatus for a number of reasons, not the least of which is the small physical size of a typical light valve panel such as a DVD, LCD or GLV. Typically such light valves are approximately one inch square. Also the frame rate of a light valve is much high than a conventional CRT imaging system. Light valves can produce frame rates much higher than a CRT. Furthermore, the brightness levels achieved through light valve technology is in the thousands of ANSI lumens, thus making the use of light valves ideal for use in the video image rotating apparatus 10.

The overlapping images produced by the light valves 12a–12c are projected through the Phillips prism 14 to the lens assembly 16. The lens assembly 16 comprises a Pechan prism 72 disposed between two sets of refractive lenses 74 and 76. The first set of lenses 74 is positioned within a rear lens barrel 78, and the second set of lenses 76 is positioned within a front lens barrel 80. Lens spacer's 82 are utilized to properly position the individual lenses to achieve the desired optical effect through the lens assembly 16.

The Pechan prism 72 advantageously expands the video image received from the projector 30 and may, if desired, be utilized to rotate the video image mechanically, rather than electronically, in synchronization with rotation of the rear projection screen 26. Such mechanical rotation can be accomplished by simply turning the Pechan prism 72 about a longitudinal axis extending through the lens assembly 16. By rotating the Pechan prism 72 in synchronization with rotation of the rear projection screen 26, the image provided on the screen will be the same regardless of the angular orientation of the screen 26 about its axis of rotation.

It is preferred, however, that an electronic image rotation system 84 be utilized to electronically rotate the video image projected through the lens assembly 16. In this regard, and with reference to FIG. 8, the electronic image rotation system 84 electronically rotates the video image projected through the projection lens assembly 16 after processing a composite input video signal into a separated format of red, green, and blue signals, and horizontal and vertical synchronization pulses. The image rotation system makes the image displayed by the light valves 12a–12c appear to rotate by electronically storing the separated synchronization pulses and color data of the video input signal in random access memories, and then processing the stored data to generate the image at various angles of rotation as schematically illustrated in FIG. 7.

Figure 8:
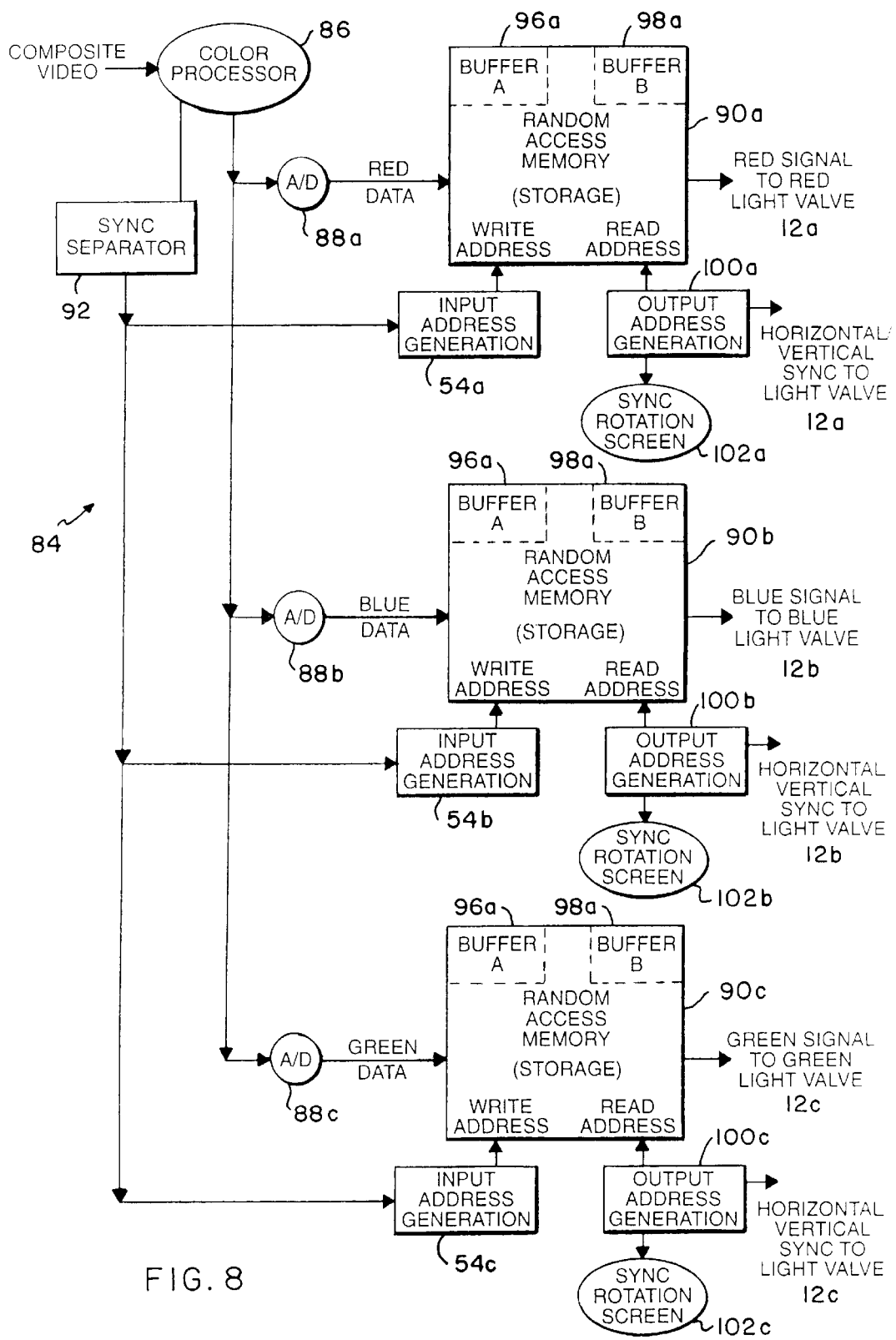
FIG. 8 is a logic diagram illustrating the processing of a composite video signal to create a stepped-rotating image in the face of each of the three light valves surrounding the Phillips prism of FIG. 6, which step-wise rotation of the video image corresponds with rotation of the projection screen through its 360° arc.

More specifically, with reference to FIG. 8, a color processor circuit 86 separates red, green and blue image data contained in the composite video input signal. These analog signals are converted to a digital format by analog to digital converters 88 a–c. After being converted to a digital format, the red, green and blue image data is stored in respective random access memories (RAM) 90a–c. The composite video input signal is also separated into horizontal and vertical synchronization pulses by a sync separator circuit 92. The horizontal and vertical synchronization pulses provide input to input address generation circuits 94a–c, which dictates how digital information from the converters 88a–c is stored within the RAM 90a–c.

Each RAM 90 creates a buffer A 96 and a buffer B 98 which are alternately used for receiving/storing the incoming video signal and creating an outgoing rotated video signal. The digital red, green and blue image data is stored in the respective buffer A 96 while the buffer B 98 is used in creating the rotated video output signal. After the buffer A has been used for storage and the rotated output signal has been created in buffer B, the buffers A and B are interchanged in use such that color image data is stored in the buffer B while the buffer A is used in creating the rotated output signal. The buffers A and B alternate functions in this manner continuously. To facilitate the storage of received data in the RAM 90, the input address generation circuit 94 resets at the beginning of each video frame to select an initial, predetermined RAM location in either the buffer A or the buffer B for storage. This reset action is timed to coincide with every other vertical synchronization pulse inputted by the sync separator circuit 92 to the input address generation circuit 94.

Output address generation circuits 100a–c select data stored in the RAM 90a–c according to an algorithm which recreates a video output signal from the stored data. The output address generation circuits 100a–c electronically rotate the input image in a stepped fashion. This stepped rotation occurs at a sufficiently rapid rate (at least 1440 rpm) so that the human eye only perceives continuous movement. The output address generation circuits 100a–c may also utilize the algorithm to distort the rotated video output signal as desired. The output address generation circuits 100a–c send to the respective light valve 12a–12c the rotated, distorted video output signal as well as a horizontal/vertical synchronization signal, in stepped pulses.

Viewing of the image is controlled by the window that rotates in synchronization with the screen 26. The synchronization of the viewing window's location with the rotation of the screen is provided by sync rotating screen circuits 102a–c, which receive input from the output address generation circuits 100a–c.

Figure 3:
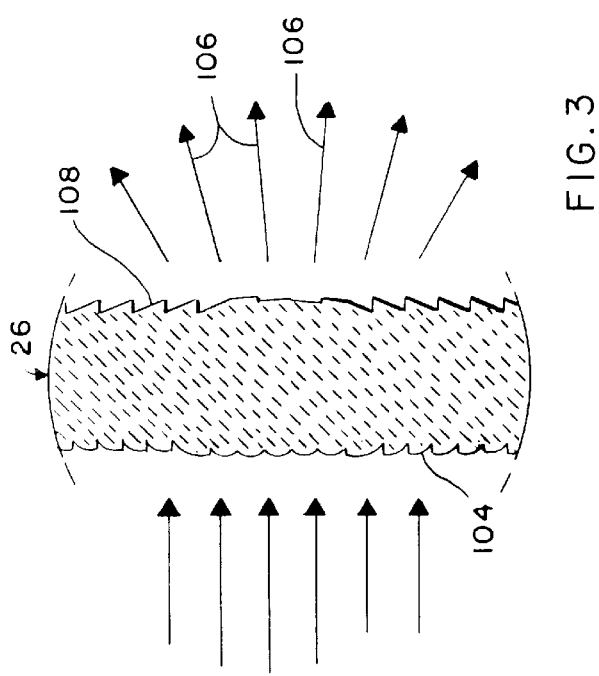
FIG. 3 is an enlarged fragmented vertical section of the projection screen taken generally of the area indicated by the number 3 in FIG. 2.
Figure 4:
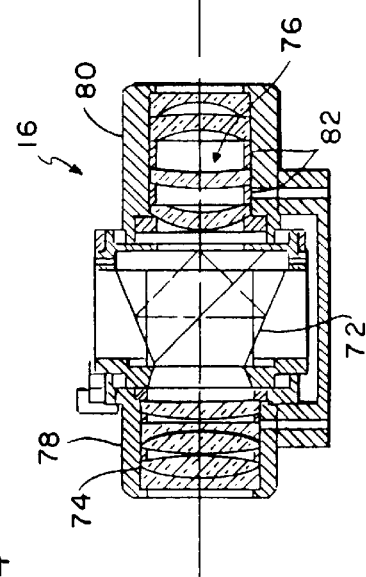
FIG. 4 is an enlarged view of the projection lens assembly illustrated in FIG. 2.

A unique aspect of the present invention lies in the construction of the rear projection screen 26. With reference to FIG. 3, the rear projection lens 26 is provided two distinctly different surfaces which act to expand the projected image generally parallel to the screen's axis of rotation, and constrict the width of the projected image generally perpendicularly to the screen's axis of rotation. More particularly, the rear surface 104 of the screen 26 comprises a micro cylindrical structure on top of a positive macro cylindrical structure, wherein the macro and micro cylindrical structures are parallel to the width of the projection screen. The micro cylindrical structure comprises radial surfaces having a radius of approximately 213 microns and a pitch of approximately 250 microns. The macro cylindrical structure comprises a radial surface having a radius of approximately 340 mm. This particular surface construction provides means for expanding the projected image generally parallel to the screen's axis of rotation as indicated by the arrows 106.

The front surface 108 forms a fresnel positive cylindrical lens which is parallel to the height of the projection screen. The fresnel lens has a pitch of approximately 0.33 mm and a focal length of approximately f1=730 mm on a radius of a cylinder equal to 360 mm. The front surface 108 provides the means for constricting the width of the projected image generally perpendicularly to the screen's axis of rotation. This unique construction of the rear projection screen 26 advantageously allows the light generated by the light source 70 to be focused on a relatively narrow strip that is viewed through the window 52 in the light shield 50. This increases the intensity of the light through the screen 26, resulting in a brighter image viewable during operation of the video image rotating apparatus 10.

In operation the red, green and blue image data is processed through the image rotation system 84 and fed to the respective light valves 12a–12c within the projector 30. The Phillips prism 14 serves to combine the images from the three light valves and project the combined images through the lens assembly 16. The lens assembly 16 expands the video image and projects it onto the first mirror 18. The video image is sequentially reflected from the first mirror 18 to the second mirror 20 to the third mirror 22 to the fourth mirror 24 and finally onto the rear surface of the rear projection screen 26. The construction of the rear projection screen 26 expands the projected image vertically but restricts the horizontal width of the image to concentrate the image and its light intensity into a relatively narrow section. This advantageously increases the intensity of the image viewed through the window 52.

It should be understood that not necessarily all of an image received through a composite video signal will be displayed through the video image rotating apparatus 10 at any one given time. Rather, it is likely that only a part of the image contained in the composite video signal will be displayed on any one rotation. However, rotation of the rear projection screen 26 should be sufficiently fast to enable the image provided by the composite video signal to be recreated in a scanned manner such that to the human eye full motion video is provided with sufficient brightness and light intensity without the noticeable blur that has been associated with prior 360° viewing systems.

From the foregoing it will be appreciated that the video image rotating apparatus 10 of the present invention can be placed in a central location, such as on top of a conference table, about which are seated a number of persons who wish to view a picture. As the electronic image rotation system 84 electronically rotates an image on the light valves 12a–12c in synchronization with rotation of the rear projection screen 26, each viewer will see the picture clearly and distinctly each time that the window 52 is aligned with the viewer's line of sight. The net effect is that an entire group of gathered persons can view the same picture simultaneously.

While a particular form of the invention has been illustrated and described, it will be apparent that various modifications can be made without departing from the spirit and scope of the invention. Accordingly, it is not intended that the invention be limited, except as by the appended claims.

We claim:

1. A video image rotating apparatus, comprising
a projection screen;
means for rotating the projection screen about an axis; and
an optical system for continuously projecting an image onto the projection screen;
wherein the projection screen includes means for expanding the projected image generally parallel to the screen's axis of rotation, and means for constricting the width of the projected image generally perpendicularly to the screen's axis of rotation, said expanding means comprising a first surface of the projection screen including a micro cylindrical structure on top of a positive macro cylindrical structure, wherein the macro and micro cylindrical structures are parallel to the width of the projection screen.

2. The video image rotating apparatus of claim 1, wherein the micro cylindrical structure comprises radial surfaces having a radius of approximately 213 microns and a pitch of approximately 250 microns, and wherein the macro cylindrical structure comprises a radial surface having a radius of approximately 340 mm.

3. The video image rotating apparatus of claim 1, wherein the means for constricting the width of the projected image generally perpendicularly to the screen's axis of rotation comprises a second surface of the projection screen that forms a fresnel positive cylindrical lens parallel to the height of the projection screen.

4. The video image rotating apparatus of claim 3, wherein the fresnel lens has a pitch of approximately 0.33 mm and a focal length of approximately f1=730 mm on a radius of a cylinder equal to 360 mm.

5. The video image rotating apparatus of claim 1, wherein the optical system comprises light valve means for creating the image, light guiding means, and optical means, wherein the optical means projects the image from the light valve means to the light guiding means which, in turn, directs the image to the projection screen.

6. The video image rotating apparatus of claim 5, wherein the optical means includes a Pechan prism.

7. The video image rotating apparatus of claim 6, wherein the means for rotating the projection screen includes means for synchronously rotating the projection screen and the light guiding means at a predetermined rate of rotation.

8. The video image rotating apparatus of claim 7, wherein the projection screen is rotated about the axis of rotation, which axis bisects the projection screen, wherein the light guiding means includes at least one mirror disposed along said axis of rotation and which is rotatable thereabout.

9. The video image rotating apparatus of claim 6, wherein the optical means includes a projection lens assembly associated with the Pechan prism.

10. The video image rotating apparatus of claim 5, wherein the light valve means comprises a plurality of high definition light valves and a Phillips prism that aligns images produced by the plurality of light valves for projection through the optical means.

11. The video image rotating apparatus of claim 10, wherein the light valves include hexagonal pixel members.

12. The video image rotating apparatus of claim 5, wherein the light guiding means includes first, second, third and fourth mirrors, wherein the first mirror is positioned to intercept the projected image from the optical means and reflect the image to the second mirror, the second mirror is positioned to intercept the reflected image from the first mirror and reflect the image onto the third mirror, the third mirror is positioned to intercept the reflected image from the second mirror and reflect the image onto the fourth mirror, and wherein the fourth mirror is positioned to intercept the reflected image from the third mirror and reflect the image onto the projection screen.

13. The video image rotating apparatus of claim 12, wherein the first mirror and the projection screen are located on the axis of rotation.

14. The video image rotating apparatus of claim 5, including an electronic image rotation system for electronically rotating the image produced by the light valve means, the image rotation system including:

a color processor circuit for separating red, green and blue signals contained in a composite video input signal;

analog to digital conversion means for converting the red, green and blue signals from an analog to a digital format;

random access memory means for storing digital red, green and blue image data; and an output address generation circuit which selects data stored in the random access memory means according to an algorithm that creates a rotated video output signal from the stored image data such that an image recreated from the rotated video output signal will appear rotated from a stored image.

15. The video image rotating apparatus of claim 14, wherein the image rotation system further includes an input address generation circuit which selects a location for storing the digital red, green and blue image data within the random access memory means.

16. The video image rotating apparatus of claim 15, further including a separator circuit for separating the composite video input signal into horizontal and vertical synchronization pulses for the input address generation circuit.

17. The video image rotating apparatus of claim 16, wherein the random access memory means provides first and second buffers which are alternately used to receive the video input signal and create the rotated video output signal.

18. The video image rotating apparatus of claim 17, wherein the input address generation circuit resets to select a location in either the first or the second buffer at the beginning of each video frame, every other vertical synchronization pulse.

19. A video image rotating apparatus, comprising:

light valve means for creating a video image;

a rear projection screen rotatable about an axis;

an optical system for continuously projecting the image from the light valve means onto the projection screen, the optical system including light guiding means and optical means, wherein the optical means projects the image from the light valve means to the light guiding means which, in turn, directs the image to the projection screen; and means for synchronously rotating the video image created by the light valve means with rotation of the projection screen about said axis;

wherein the projection screen includes means for expanding the projected image generally parallel to the screen's axis of rotation, and means for constricting the width of the projected image generally perpendicularly to the screen's axis of rotation, said expanding means comprising a first surface of the projection screen including a micro cylindrical structure on top of a positive macro cylindrical structure, wherein the macro and micro cylindrical structures are parallel to the width of the projection screen.

20. The video image rotating apparatus of claim 19, wherein the video image rotating means comprises an electronic image rotation system for electronically rotating the image produced by the light valve means.

21. The video image rotating apparatus of claim 20, wherein the electronic image rotation system includes:

a color processor circuit for separating red, green and blue signals contained in a composite video input signal;

analog to digital conversion means for converting the red, green and blue signals from an analog to a digital format;

random access memory means for storing digital red, green and blue image data; and an output address generation circuit which selects data stored in the random access memory means according to an algorithm that creates a rotated video output signal from the stored image data such that an image recreated from the rotated video output signal will appear rotated from a stored image.

22. The video image rotating apparatus of claim 21, wherein the image rotation system further includes an input address generation circuit which selects a location for storing the digital red, green and blue image data within the random access memory means, and a separator circuit for separating the composite video input signal into horizontal and vertical synchronization pulses for the input address generation circuit, wherein the random access memory means provides first and second buffers which are alternately used to receive the video input signal and create the rotated video output signal, and wherein the input address generation circuit resets to select a location in either the first or the second buffer at the beginning of each video frame, every other vertical synchronization pulse.

23. The video image rotating apparatus of claim 19, wherein the optical means includes a Pechan prism.

24. The video image rotating apparatus of claim 23, wherein the optical means includes a projection lens assembly associated with the Pechan prism.

25. The video image rotating apparatus of claim 19, wherein the means for rotating the projection screen includes means for synchronously rotating the projection screen and the light guiding means at a predetermined rate of rotation.

26. The video image rotating apparatus of claim 19, wherein the light valve means comprises a plurality of high definition light valves.

27. The video image rotating apparatus of claim 26, wherein the light valve means further comprises a Phillips prism that aligns images produced by the plurality of light valves for projection through the optical means.

28. The video image rotating apparatus of claim 26, wherein the light valves include hexagonal pixel members.

29. The video image rotating apparatus of claim 19, wherein the light guiding means includes first, second, third and fourth mirrors, wherein the first mirror is positioned to intercept the projected image from the optical means and reflect the image to the second mirror, the second mirror is positioned to intercept the reflected image from the first mirror and reflect the image onto the third mirror, the third mirror is positioned to intercept the reflected image from the second mirror and reflect the image onto the fourth mirror, and wherein the fourth mirror is positioned to intercept the reflected image from the third mirror and reflect the image onto the projection screen, the first mirror and the projection screen being located on the axis of rotation.

30. The video image rotating apparatus of claim 19, wherein the means for constricting the width of the projected image generally perpendicularly to the screen's axis of rotation comprises a second surface of the projection screen that forms a fresnel positive cylindrical lens parallel to the height of the projection screen.

31. A video image rotation apparatus, comprising:
a projection screen;
means for rotating the projection screen about an axis; and
an optical system for continuously projecting an image onto the projection screen, the optical system comprising light valve means for creating the image, light guiding means, and optical means, wherein the optical means projects the image from the light valve means to the light guiding means which, in turn, directs the image to the projection screen, wherein the light valve means comprises a plurality of high definition light valves and a Phillips prism that aligns images produced by the plurality of light valves for projection through the optical means;
wherein the projection screen includes means for expanding the projected image generally parallel to the screen's axis of rotation, and means for constricting the width of the projected image generally perpendicularly to the screen's axis of rotation, wherein the means for expanding the projected image generally parallel to the screen's axis of rotation comprises a first surface of the projection screen including a micro cylindrical structure on top of a positive macro cylindrical structure, wherein the macro and micro cylindrical structures are parallel to the width of the projection screen, and wherein the means for constricting the width of the projected image generally perpendicularly to the screen's axis of rotation comprises a second surface of the projection screen that forms a fresnel positive cylindrical lens parallel to the height of the projection screen.

32. The video image rotating apparatus of claim 31, wherein the optical means includes a Pechan prism and wherein the optical means includes a projection lens assembly associated with the Pechan prism.

33. The video image rotating apparatus of claim 31, wherein the means for rotating the projection screen includes means for synchronously rotating the projection screen and the light guiding means at a predetermined rate of rotation, and the light guiding means includes first, second, third and fourth mirrors, wherein the first mirror is positioned to intercept the projected image from the optical means and reflect the image to the second mirror, the second mirror is positioned to intercept the reflected image from the first mirror and reflect the image onto the third mirror, the third mirror is positioned to intercept the reflected image from the second mirror and reflect the image onto the fourth mirror, and wherein the fourth mirror is positioned to intercept the reflected image from the third mirror and reflect the image onto the projection screen, the first mirror and the projection screen being located on the axis of rotation.

34. The video image rotating apparatus of claim 31, wherein the light valves include hexagonal pixel members.

35. The video image rotating apparatus of claim 31, including an electronic image rotation system for electronically rotating the image produced by the light valve means, the image rotation system including:
a color processor circuit for separating red, green and blue signals contained in a composite video input signal;
analog to digital conversion means for converting the red, green and blue signals from an analog to a digital format;
random access memory means for storing digital red, green and blue image data; and
an output address generation circuit which selects data stored in the random access memory means according to an algorithm that creates a rotated video output signal from the stored image data such that an image recreated from the rotated video output signal will appear rotated from a stored image.

36. The video image rotating apparatus of claim 35, wherein the image rotation system further includes an input address generation circuit which selects a location for storing the digital red, green and blue image data within the random access memory means, and a separator circuit for separating the composite video input signal into horizontal and vertical synchronization pulses for the input address generation circuit, wherein the random access memory means provides first and second buffers which are alternately used to receive the video input signal and create the rotated video output signal, and wherein the input address generation circuit resets to select a location in either the first or the second buffer at the beginning of each video frame, every other vertical synchronization pulse.

37. A video image rotating apparatus, comprising:
a projection screen;
means for rotating the projection screen about an axis;
and an optical system for continuously projecting an image onto the projection screen, the optical system including light guiding means and optical means, wherein the optical means projects the image to the light guiding means which, in turn, directs the image to the projection screen;
wherein the projection screen includes a surface thereof which forms a fresnel positive cylindrical lens for constricting the width of the projected image generally perpendicularly to the screen's axis of rotation.

38. The video image rotating apparatus of claim 37, wherein the optical system further includes a plurality of high definition light valves for producing the image.

39. The video image rotating apparatus of claim 37, wherein the light valves include hexagonal pixel members.

40. The video image rotating apparatus of claim 37, including a Phillips prism associated with the plurality of high definition light valves, that aligns images produced by the plurality of light valves for projection through the optical means.

41. The video image rotating apparatus of claim 37, wherein the projection screen includes means for expanding the projected image generally parallel to the screen's axis of rotation, said projected image expanding means including another surface of the projection screen having a micro cylindrical structure on top of a positive macro cylindrical structure, wherein the macro and micro cylindrical structures are parallel to the width of the projection screen.

42. A video image rotating apparatus, comprising:
light valve means for creating a video image;
a rear projection screen rotatable about an axis;
an optical system for continuously projecting the image from the light valve means onto the projection screen, the optical system including light guiding means and optical means, wherein the optical means projects the image from the light valve means to the light guiding means which, in turn, directs the image to the projection screen; and means for synchronously rotating the video image created by the light valve means with rotation of the projection screen about said axis;

wherein the projection screen includes means for expanding the projected image generally parallel to the screen's axis of rotation, and means for constricting the width of the projected image generally perpendicularly to the screen's axis of rotation, said constricting means comprising a second surface of the projection screen that forms a fresnel positive cylindrical lens parallel to the height of the projection screen.

* * * * *